United States Patent [19]

White

[11] Patent Number: 4,501,429
[45] Date of Patent: Feb. 26, 1985

[54] MECHANICAL SEAL FLUSH AGITATOR AND WEAR MONITOR FOR MECHANICAL SEALS

[75] Inventor: Richard E. White, Newark, N.Y.

[73] Assignee: Garlock Inc., Palmyra, N.Y.

[21] Appl. No.: 480,387

[22] Filed: Mar. 30, 1983

[51] Int. Cl.³ .................... F16J 15/16; F16J 15/34; G02B 5/17
[52] U.S. Cl. .......................... 277/24; 277/2; 277/68; 277/237 R; 350/96.26
[58] Field of Search ............ 277/1, 2, 9, 23–25, 277/67–69, 81 R, 130–132, 237

[56] References Cited

U.S. PATENT DOCUMENTS

| 1,539,941 | 6/1925 | Gentry | 277/25 X |
| 1,570,285 | 1/1926 | Schleyer | 415/111 X |
| 2,276,824 | 3/1942 | Carruthers | 415/121 X |
| 2,312,430 | 3/1943 | Magnuson | 277/2 X |
| 4,386,780 | 6/1983 | Dernedde | 277/24 X |

Primary Examiner—Robert S. Ward
Attorney, Agent, or Firm—Sixbey, Friedman & Leedom

[57] ABSTRACT

A mechanical seal includes a drive sleeve on a rotating shaft having a flush agitator thereon. The flush agitator includes a fluid contacting surface that is in the form of a non-directional trisymmetric sine wave and creates particle movement away from the shaft. Seal face dissipation is monitored using an optical device located outside of the seal housing and having a portion thereof focused on a seal element which moves in response to seal face dissipation.

10 Claims, 7 Drawing Figures

MECHANICAL SEAL FLUSH AGITATOR AND WEAR MONITOR FOR MECHANICAL SEALS

TECHNICAL FIELD

The present invention relates, in general, to mechanical shaft seals, and, more particularly, to means for protecting the sealing faces of mechanical seals from fluid borne contaminants while providing an indication of sealing face wear.

BACKGROUND ART

The sealing faces of mechanical shaft seals are extremely important to the integrity of such seals. To establish and ensure a fluid-tight seal, the sealing faces between the abutting sealing members of a mechanical seal must be maintained as planar as possible. For example, there are applications for mechanical seals requiring that the surface flatness of the abutting seal faces to be within three light bands. Thus, anything which may disrupt seal face flatness may debilitate seal performance.

The finish or smoothness of the seal faces is also extremely important to the proper functioning of a mechanical seal. Scratches or other blemishes on the seal surfaces which are damaging to the finish thus can be detrimental to seal performance. Scratch depths as little as several microinches can be sufficient to facilitate seal leakage.

Contaminants in the fluid to which a mechanical shaft seal is subject can seriously damage seal face integrity. Often such contaminants include particles of sufficient size and hardness to damage the seal faces if the particles become positioned between the abutting seal faces. Although some protection against particle damage to the seal faces is provided by selecting proper materials for the seals, this protection can be expensive and difficult to accomplish effectively. With seal component wear and long exposure to fluid under pressure which bears contaminants, some particulate material is likely to reach the sealing surfaces of a mechanical seal. Therefore, there is need for a mechanical means for inhibiting potential seal damaging particles from reaching the seal faces of a mechanical seal.

Also, during the normal operation of a mechanical seal, the seal faces will ultimately wear due to friction therebetween. To prevent unexpected failure of the seal, there is need to monitor such seal face dissipation so that potential seal failure can be anticipated. Heretofore, such failure has been signalled by increasing leakage.

DISCLOSURE OF THE INVENTION

It is a primary object of the present invention to provide a novel and improved mechanical seal flush agitator and wear monitor for mechanical seals which will inhibit the migration of particulate matter contained in fluid to which the seal is exposed to the sealing surfaces of the seal. The wear monitor is intended to provide an indication of the degree to which the sealing surfaces have been exposed to wear.

Another object of the present invention is to provide a novel and improved mechanical seal flush agitator on a drive sleeve for the seal. The end surface of a radial extension on a drive sleeve is provided with a symmetrical impeller configuration to pump fluid borne contaminants away from the end surface of the radial extension.

A further object of the present invention is to provide a novel and improved mechanical seal flush agitator which includes a sinusoidal impeller configuration formed on the end surface of a drive sleeve. The peaks of the sinusoid decrease in height from the outer edge of the end surface toward the center thereof.

Another object of the present invention is to provide a novel and improved mechanical seal flush agitator which includes planar inclined impeller surfaces formed on the end of a drive sleeve to force fluid borne particulate matter away from the end of the drive sleeve.

A still further object of the present invention is to provide a novel and improved wear monitor for mechanical seals which provides a visual, optical or pressure indication of the extent of seal surface wear. This wear monitor extends through a seal housing member to expose indicia formed on a longitudinally movable seating member for a seal unit, or to expose a pressure transducer to fluid pressure in the monitor.

These objects are accomplished by providing a flush agitator on one end of a drive sleeve which surrounds a shaft and rotates therewith. The flush agitator includes a surface which is engaged by the fluid associated with the shaft, and preferably is located within a stuffing box associated with the mechanical seal. This surface is configured so that any particulate matter contacting the surface during rotation of the drive sleeve will be forced away from the surface of the agitator and maintained in motion. In the preferred embodiment, this surface is sinusoidal in configuration with an amplitude which increases as radial distance from the shaft increases. Also, the surface is preferably symmetrical and non-directional. That is, the surface is shaped so that the flush agitator will be effective no matter what direction the shaft rotates.

A monitoring means is positioned in a housing associated with the seal, and includes means for visually observing elements associated with the seal faces. These elements are intended to move in response to seal face dissipation, so that indicia placed on these moving elements will indicate when the seal faces should be replaced. In a preferred embodiment, a plastic or fiber optic conducting device is installed into a gland face or cartridge body associated with the mechanical seal. A seal element carrier is provided with indicia, and the optic device is focused onto the indicia thereby providing a visual indicator externally of the housing or gland. As wear dissipates the seal faces, the indicia moves across the focal plane of the optical or visual sensor. Alternatively a pressure transducer may replace the fiber optic conducting device to sense fluid pressure.

BRIEF DESCRIPTION OF THE INVENTION

BEST MODE FOR CARRYING OUT THE INVENTION

Figure 2:
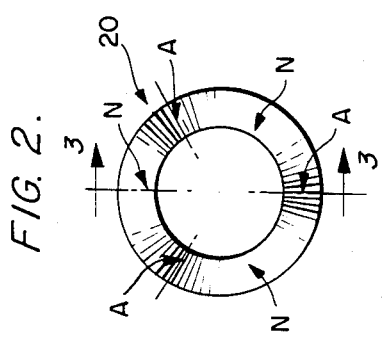
FIG. 2 is an end elevational view of a flush agitator formed on a drive sleeve for the mechanical seal of FIG. 1.
Figure 3:
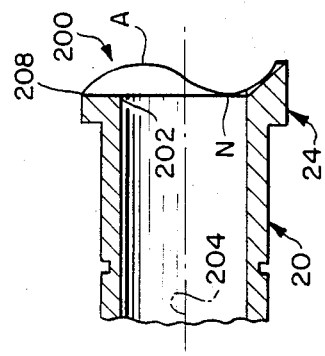
FIG. 3 is a view taken along line 3—3 of FIG. 2.
Figure 1:
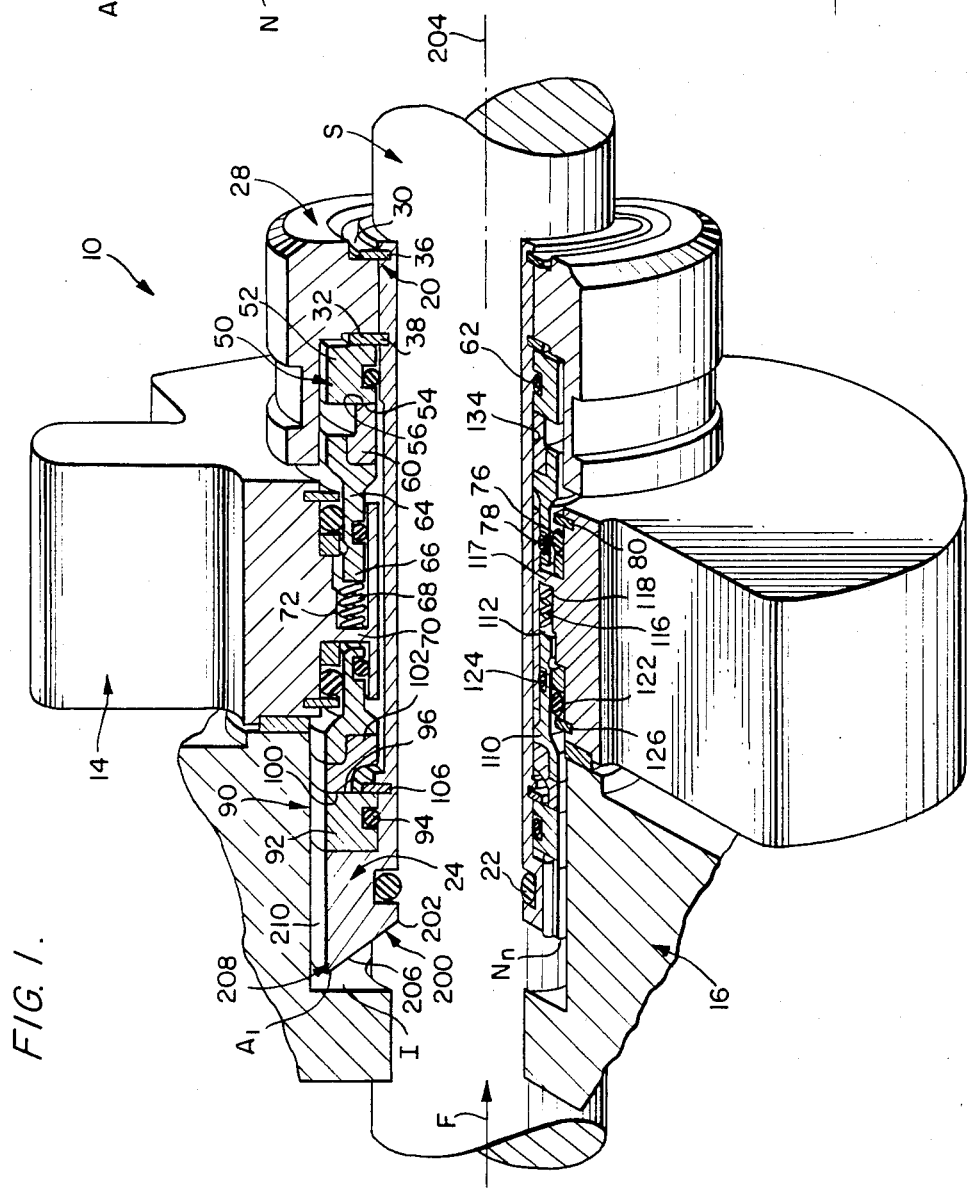
FIG. 1 is a cutaway sectional view of a mechanical seal embodying the mechanical seal flush agitator of the present invention.

Referring now to FIG. 1, a mechanical seal indicated generally at 10 is mounted to provide a non-leaking fluid tight joint about a shaft S. The mechanical seal 10, embodying the teachings of the present invention, may include a number of known mechanical seal constructions, including a double seal as illustrated in FIG. 1 or a single seal, if suitable. Shaft S can be a pump shaft, or other such element, and it is to be understood that the description of the double mechanical seal 10 in combination with a pump shaft S is intended for illustrative purposes only and not for purposes of limitation. For example, mechanical seals may also be used on agitators, mixers, or the like.

As shown in FIG. 1, the mechanical seal 10 includes a gland 14 which is suitably mounted so as to be stationary with respect to a housing or a stuffing box 16. The shaft is in a fluid environment, and the general direction of fluid pressure exerted on the mechanical seal 10 is shown in FIG. 1 by the arrow F for purposes of discussion.

The stuffing box 16 is associated with the mechanical seal 10 and is mounted to enclose the shaft S. A drive sleeve 20 is mounted on the shaft S for rotation therewith and extends from the stuffing box along the shaft in the axial direction thereof. An O-ring 22 seals the drive sleeve to the shaft within the interior of the stuffing box.

The drive sleeve 20 includes a radial extension 24 within the stuffing box, and a drive collar 28 is mounted on the end of the drive sleeve opposite said radial extension and secured thereto by snap rings 30 and 32 seated on the sleeve in grooves 36 and 38, respectively. It should be noted that the drive sleeve 20 need not extend completely through the seal 10 as indicated in FIG. 1, but may, for some applications, extend only part of the way through the seal.

Basically, the components of the mechanical seal 10 include a first seal 50 formed by an outboard rotary seal ring 52 mounted on the drive sleeve 20 within the drive collar 28. This seal ring includes a flat seal face 54 in sliding abutting relationship with a flat seal face 56 on an outboard stationary sealing ring 60. An O-ring 62 surrounds the drive sleeve and seals the drive sleeve to the outboard rotary seal ring which rotates with the shaft S, whereas the stationary sealing ring 60 remains stationary with respect to the housing or stuffing box.

An outboard sealing ring holder 64 urges the outboard stationary sealing ring 60 against the outboard rotary mating ring with a prescribed amount of sealing force. The sealing ring holder has an end 66 engaged by one end of a spring 68 which is seated against a spring retainer septum 70 formed in the gland 14. A spring pocket 72 in the gland houses the spring, and generally a plurality of springs 68 arranged concentrically provide the desired force on the sealing ring holder 64. O-rings 76 and 78 and a snap ring 80 are interposed between the gland and the sealing ring holder 64 and sealingly mount the sealing ring holder to the gland.

As thus far described, the mechanical seal 10 includes components conventional to known single mechanical seals. As shown in FIG. 1, the mechanical seal system 10 is a double seal and includes a second seal 90 which is located upstream of the first seal 50. The seal 90 is similar to the seal 50, and includes an inboard rotary seal ring 92 mounted on the drive sleeve 20 for rotation with the shaft S and sealed to the drive sleeve by an O-ring 94. The seal ring 92 includes a flat seal face 96 which is in sliding abutting relationship with a flat seal face 100 of an inboard stationary sealing ring 102. A snap ring 106 is mounted on the sleeve 20 adjacent the inboard rotary seal ring 92.

An inboard sealing ring holder 110 yieldingly urges the inboard stationary sealing ring 102 against the inboard rotary seal ring 92 with a prescribed amount of force. The sealing ring holder 110 has an end 112 engaged by one end of a spring 116 which is seated against a spring retainer septum 117 of the gland. A spring pocket 118 houses the spring 116 and, like the spring 68, a plurality of springs 116 is normally used. O-rings 122 and 124 and snap ring 126 are interposed between the gland 14 and the sealing ring holder 110 and sealingly mount the holder to the gland.

In conventional mechanical seals, the sealing surfaces of the seals 50 and 90 are subject to damage from contaminants in fluid to which the mechanical seal 10 is subjected. Some of these contaminants eventually reach these sealing surfaces in spite of the O-rings and other seal components designed to isolate the sealing surfaces from the fluid.

In accordance with the teachings of the present invention, a flush agitator 200 is formed on the face of the radial extension 24 to move contaminants which may be entrained in fluid within the stuffing box 16 away from the seals 50 and 90. Furthermore, the flush agitator 200 is intended to prevent such contaminants from accumulating within the stuffing box.

Figure 4:
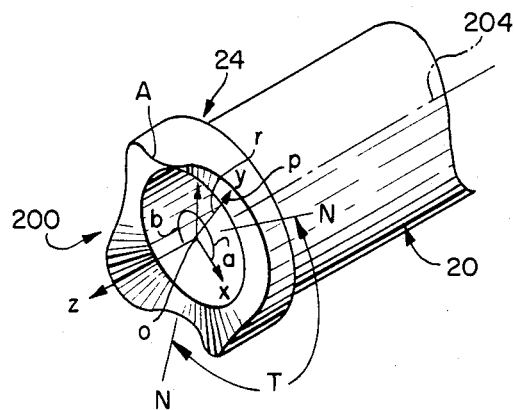
FIG. 4 is a perspective view of a drive sleeve having thereon the flush agitator of FIG. 2.

As best shown in FIG. 4, the flush agitator 200 is formed on the end surface of the radial extension 24 of the drive sleeve 20. For the purposes of describing the flush agitator 200, x-y-z coordinate axes are shown in FIG. 4. The coordinate axes x and y are located in the plane of the inner edge 202 on the end face of radial extension 24 (FIG. 1) and are oriented to be perpendicular to the longitudinal centerline 204 of the drive sleeve 20. The origin, 0, of the coordinate axes is located on the centerline 204, and the z-axis extends along that longitudinal centerline with the y-axis being directed upwards in FIG. 4 and the x-axis being perpendicular to both the y and z axes. A unit vector r originating at the origin 0 and extending to a point P in space is defined on the coordinate axes. This unit vector forms an angle a with the x-y plane and an angle b with the x-z plane.

Accordingly, if the point P is located on inner edge 202, the unit vector will have a length equal to the radius of the sleeve bore and will form an angle b equal to zero degrees. As the vector r rotates in the x-y plane, angle a covers 2 pi radians while the length of the unit vector remains constant, thereby defining a circle for inner edge 202.

As shown in FIG. 1, the flush agitator 200 includes a continuous end surface 206 which extends from the inner edge 202 to an outer edge 208. This outer edge has a curved configuration in the y-z plane. Thus, if the point P is located on the outer edge 208, and the vector r rotates through 2 pi radians in the x-y plane while having a constant length equal to the outer radius of the radial extension 24, the point P will oscillate in the y-z plane between b equal to a right angle and b equal to an acute angle. As shown in FIG. 4, in the preferred embodiment of the invention, as the vector r rotates about the z-axis, the point P traverses a sinusoidally shaped path. The outer edge 208 is thus defined as being sinusodially shaped.

Being sinusoidal, the outer edge has a period T, nodes N and apices A, with the period being defined as the distance between two identical points on the surface. If point P lies at a node N, angle b is equal to zero and the unit vector is in the x-y plane as defined hereinabove, if suitable. If point P is on an apex A, that point is spaced from the x-y plane axially along the centerline 204 of the sleeve. As shown in FIG. 1, the edge 208 has an apex $A_1$ and a node $N_n$.

In the preferred embodiment, there are three periods T covered by the edge 208, and all of the periods are equal. However, any number of periods can be used, and the periods do not all have to be equal; although, it must be kept in mind that the drive sleeve 20 will be rotating and thus consideration must be given to dynamic balance.

Referring again to FIG. 4, as the point P moves from edge 208 to edge 202, the unit vector r shrinks from a length equal to the outer radius of the radial extension 24 to a length equal to an inner radius equal to the radius of the shaft bore for the drive sleeve 20, and angle b increases from an acute angle to a right angle. As is seen from FIG. 4, at any position for a constant length r greater than the inner radius and less than the outer radius, as r rotates about the z-axis, point P will still traverse the sinusoidal path traversed by P along edge 208. Thus, the surface 206 has a sinusoidal shape.

The shape of surface 206 is however, modified because the edge 202, in the preferred embodiment is coplanar with the coordinate axes and is circular in shape, while the edge 208 is not so designed. The surface 206 in the preferred embodiment is continuous, and thus the sinusoidal shape is most pronounced at edge 208 and essentially non-existant at the edge 202. Furthermore, in the preferred embodiment, all of the angles and radii of the surface 206 blend together smoothly.

The shape of the surface 206 is thus that of a sinusoid which has a decreasing amplitude as the unit vector shrinks. Since the surface 206 is continuous, the nodes N for the edge sinusoid will extend all the way to edge 202. It is for this reason that the surface 206 appears to extend essentially perpendicular to the axial centerline 204 of the shaft at node $N_n$ in FIG. 1, while the surface 206 is at an angle with respect to the axial centerline 204 at apex $A_1$.

It is noted that even though the edge 208 and the surface 206 are shown in the preferred embodiment to be symmetrically sinusoidally shaped, they can assume other shapes which will operate to flush contaminants away from the end surface of the radial extension 24. For example, the surface 206 can be shaped so that the point P moves sinusoidally in the y-z plane as the unit vector shrinks from the outer radius of the end of the radial extension 24 to the inner radius of that end while remaining at a fixed angle a. This sinusoid can be damped if suitable. Further modifications include the point P tracing concave paths, concave-convex paths, or even paths of non-uniform functions, which would require Fourier series or step functions to describe, as the unit vector shrinks as just mentioned. These alternative shapes can be superimposed on the various shapes of the outer circumferential edge 208 as above discussed.

It is also noted that edge 202 need not be circular, or even regular. This edge can assume many shapes such as sinusoidal in the x-z plane or the like. Those skilled in the art will be able to envision the various possibilities for this edge based on this disclosure, and for this reason, no further discussion of the edge 202 will be presented.

Still further, the shapes for the above-described elements can be chosen to be directional in nature. In such a case, the flush agitator moves contaminants outwardly only if the drive sleeve is rotating in one particular direction about the centerrotating line 204, and is inoperative if the shaft operates in the opposite direction.

The particular shapes shown in FIGS. 1 and 4 illustrate the preferred embodiment of the invention, although any shape which will have surface vectors oriented to ultimately guide or force particles away from edge 202 outwardly of the end of the radial extension 24 will be suitable.

It is noted that a surface vector is defined as the component of force imparted to a particle in a fluid contacting the surface 206 by this surface. Thus, the surface 206 should be shaped at any point thereon, to impart sufficient radially outwardly directed force, due to the rotation of the radial extension 24 with respect to the fluid, to any particles or contaminants contacting that surface to create an ultimate net force on that particle toward the outer edge 208. Although any particle at some particular position on the surface may have an instantaneous force vector not directed outwardly, the surface 206 is shaped so that ultimately this particle will be given a direction of motion which moves it outwardly toward edge 208 before that particle can move inwardly past the edge 202. The term "surface vector" encompasses this function, and any surface or edge shape used for the flush agitator 200 should be designed with this function in mind. The flush agitator is formed so that the maximum surface peak-to-peak amplitude occurs adjacent to the outer edge 208.

Figure 5:
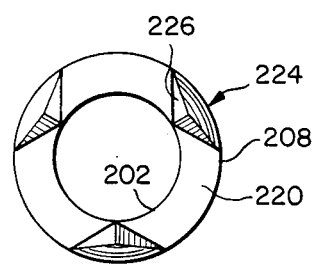
FIG. 5 is a perspective view of a second embodiment of the flush agitator of the present invention.

FIG. 5 illustrates another form of the surface 206. This embodiment includes a planar surface 220 extending from edge 202 to edge 208 with a plurality of solid FIGS. 224 projecting therefrom. These figures are shown as pyramids in FIG. 5 with angled planar faces 226 thereon. These faces can be curved and/or oriented as suitable to move particles outwardly of the flush agitator as previously discussed. Instead of the disclosed pyramidal configuration, the FIGS. 224 might each be formed by opposed inclined ramps or a single ramp extending from a surface perpendicular to the surface 220.

Figure 6:
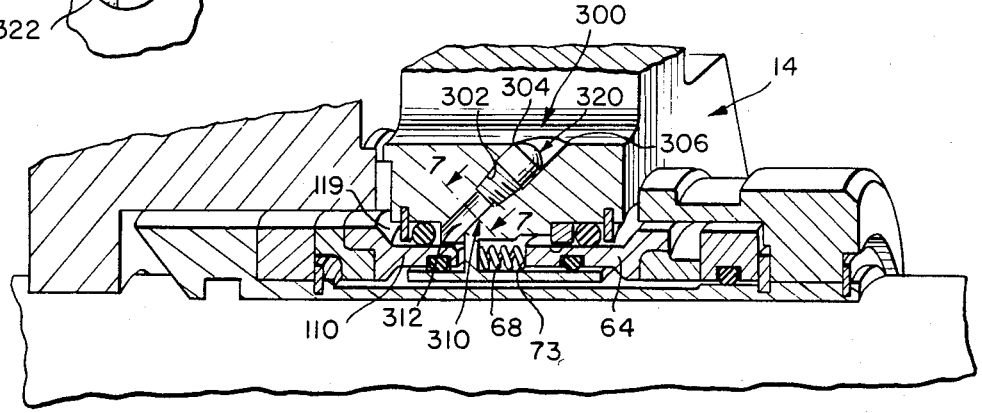
FIG. 6 is a cutaway sectional view of a mechanical seal showing the seal face wear monitoring unit of the present invention.

FIG. 6 discloses a wear monitor 300 for permitting seal wear to be observed from outside of the gland 14 which encloses the seals 50 and/or 90 and thus normally prevents direct viewing of the seals.

The wear monitor includes a seating bore section 302 formed in the gland 14 or in a cartridge body associated with the mechanical seal. The bore section 302 is internally threaded near the midportion thereof, and includes an outer end 304 which extends to outer surface 306 of the gland. A stepped bore section 310 extends from the bore section 302 to the recesses 73 or 119 in which the end of the sealing ring holders 64 or 110 are located.

A visual assisting means, such as fiber optic bundle 312 is positioned in bore section 310 and is focused on the top surface of a sealing ring holder 64 or 110. An eye-piece 320 is positioned in outer end 304 of the bore section 302.

By viewing the eye-piece from outside the gland 14 associated with the mechanical seal, movement of a respective ring holder 64 or 110 can be monitored.

These ring holders are associated with the sealing rings of the seals 50 and 90 respectively and urge those elements into sealing contact. As the sealing faces 54 and 56 or 96 and 100 dissipate through wear, damage or the like, the ring holders move longitudinally in the recesses 73 or 119 under the influence of the biasing springs 68 and 118. It is this movement which is monitored by the wear monitor 300.

Figure 7:
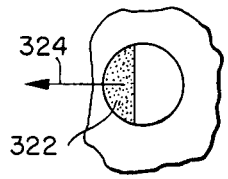
FIG. 7 is a view taken along line 7—7 of FIG. 6.

The top surface of a respective ring holder can be marked with appropriate indicia, such as black anodizing 322, or the like to emphasize the movement of the ring holder. This holder movement is illustrated in FIG. 7 by arrow 324. Other indicia can be graduated to provide an accurate and reliable measure of seal face dissipation. Such measure can then be used to predict when seal faces must be replaced or repaired.

The fiber optic bundle can be contained in a housing having a portion thereof threaded to cooperate with the threads 302 so that the bundle can be moved as necessary. If visual monitoring is not accomplished, the fiber optic bundle may be associated with an automatic optical monitoring unit which gauges ring holder movement.

The wear monitor 300 may be a pressure responsive wear monitor rather than an optical monitor. In this alternate construction, a pressure transducer would be mounted in the bore 310 in place of the fiber optic bundle. As the seal faces wear, fluid under pressure would be permitted to enter the bore 310 and act upon the pressure transducer. The fluid pressure indicated by this pressure transducer would provide an indication of the extent of seal face wear.

The wear monitor 300 can be used in conjunction with the flush means 200 to ensure the integrity of the mechanical seals 50 and/or 90.

I claim:

1. A contaminant flush agitator for a mechanical shaft seal comprising:
a sleeve having a body with a shaft receiving bore therethrough and a radial extension on one end thereof; and contaminant impeller means formed on said radial extension for moving contaminants in a fluid surrounding said seal away from said impeller means, said contaminant impeller means being formed on and end surface of said radial extension and including at least one projection extending from a base on said end surface axially of said body to an apex spaced from said base, said projection having a contaminant engaging surface sloping radially outwardly from said base toward said apex.

2. The contaminant flush agitator defined in claim 1, wherein said sleeve body extends for essentially the entire length of said mechanical seal.

3. The contaminant flush agitator as claimed in in a stuffing box associated with a mechanical seal and said impeller means prevents accumulation of contaminants within said stuffing box.

4. The contaminant flush agitator defined in claim 1, wherein said at least one projection is sinusoidally shaped.

5. The contaminant flush agitator defined in claim 4, wherein said sinusoidal projection includes a plurality of apices circumferentially and symmetrically spaced apart about the end surface of said radial extension.

6. The contaminant flush agitator defined in claim 5, wherein said projection further includes a plurality of nodes circumferentially and symmetrically spaced apart about the end surface of said radial extension.

7. The contaminant flush agitator defined in claim 1, wherein said contaminant engaging surface is continuous.

8. The contaminant flush agitator defined in claim 1, wherein said contaminant engaging surface is planar.

9. The contaminant flush agitator defined in claim 5, wherein said sinusoidal projection includes a plurality of complete sine wave periods symmetrically arranged on said end surface.

10. The contaminant agitator means defined in claim 8, wherein said projection is pyramidal in configuration.

* * * * *